US008508896B2

(12) United States Patent
Paoletti et al.

(10) Patent No.: US 8,508,896 B2
(45) Date of Patent: Aug. 13, 2013

(54) DC FEEDER PROTECTION SYSTEM

(75) Inventors: Gabriel J. Paoletti, Pennsauken, NJ (US); Robert E. Hulse, Wayne, ME (US); Charles J. Luebke, Sussex, WI (US)

(73) Assignee: Eaton Corporation, Cleveland, OH (US)

( * ) Notice: Subject to any disclaimer, the term of this patent is extended or adjusted under 35 U.S.C. 154(b) by 534 days.

(21) Appl. No.: 12/942,104

(22) Filed: Nov. 9, 2010

(65) Prior Publication Data

US 2012/0113554 A1 May 10, 2012

(51) Int. Cl.
*H02H 7/26* (2006.01)

(52) U.S. Cl.
USPC ............................................. 361/67; 361/42

(58) Field of Classification Search
USPC ...................................................... 361/42, 67
See application file for complete search history.

(56) References Cited

U.S. PATENT DOCUMENTS

| | | | | | |
|---|---|---|---|---|---|
| 1,953,127 | A | * | 4/1934 | Parsons Johns | 361/67 |
| 2,276,068 | A | * | 3/1942 | Smith et al. | 361/69 |
| 4,042,968 | A | * | 8/1977 | Kypreos et al. | 361/60 |
| 4,297,740 | A | * | 10/1981 | Hagberg | 361/67 |
| 4,475,150 | A | * | 10/1984 | D'Atre et al. | 363/51 |
| 5,552,952 | A | * | 9/1996 | Kramer et al. | 361/86 |
| 5,627,713 | A | * | 5/1997 | Takeshi | 361/67 |
| 6,496,342 | B1 | * | 12/2002 | Horvath et al. | 361/65 |
| 2006/0291121 | A1 | * | 12/2006 | Rozine et al. | 361/93.9 |
| 2009/0147415 | A1 | * | 6/2009 | Lazarovich et al. | 361/42 |
| 2011/0301772 | A1 | * | 12/2011 | Zuercher et al. | 700/293 |
| 2012/0049879 | A1 | * | 3/2012 | Crites | 324/761.01 |
| 2012/0174961 | A1 | * | 7/2012 | Larson et al. | 136/246 |

OTHER PUBLICATIONS

J. Wiles, "Ground-Fault Protection is Expanding", code corner, www.homepower.com, Feb. and Mar., 2008, pp. 102-104.

* cited by examiner

*Primary Examiner* — Ronald W Leja
(74) *Attorney, Agent, or Firm* — Eckert Seamans Cherin & Mellott, LLC; Kirk D. Houser

(57) ABSTRACT

A direct current feeder protection system includes six conductors, four current sensors sensing four currents flowing in four of the conductors, four circuit interrupters interrupting currents flowing in the four conductors, and a processor cooperating with the current sensors to input four sensed currents, and to output a number of commands to the circuit interrupters. The processor includes a routine detecting a number of: a directional current fault of the sensed currents, a differential current fault of the sensed first and third currents or the sensed second and fourth currents, and a residual current fault of the sensed first and second currents or the sensed third and fourth currents, and to responsively output the commands. The first, fifth and third conductors are electrically connected in series with two of the circuit interrupters, and the second, sixth and fourth conductors are electrically connected in series with the other circuit interrupters.

21 Claims, 8 Drawing Sheets

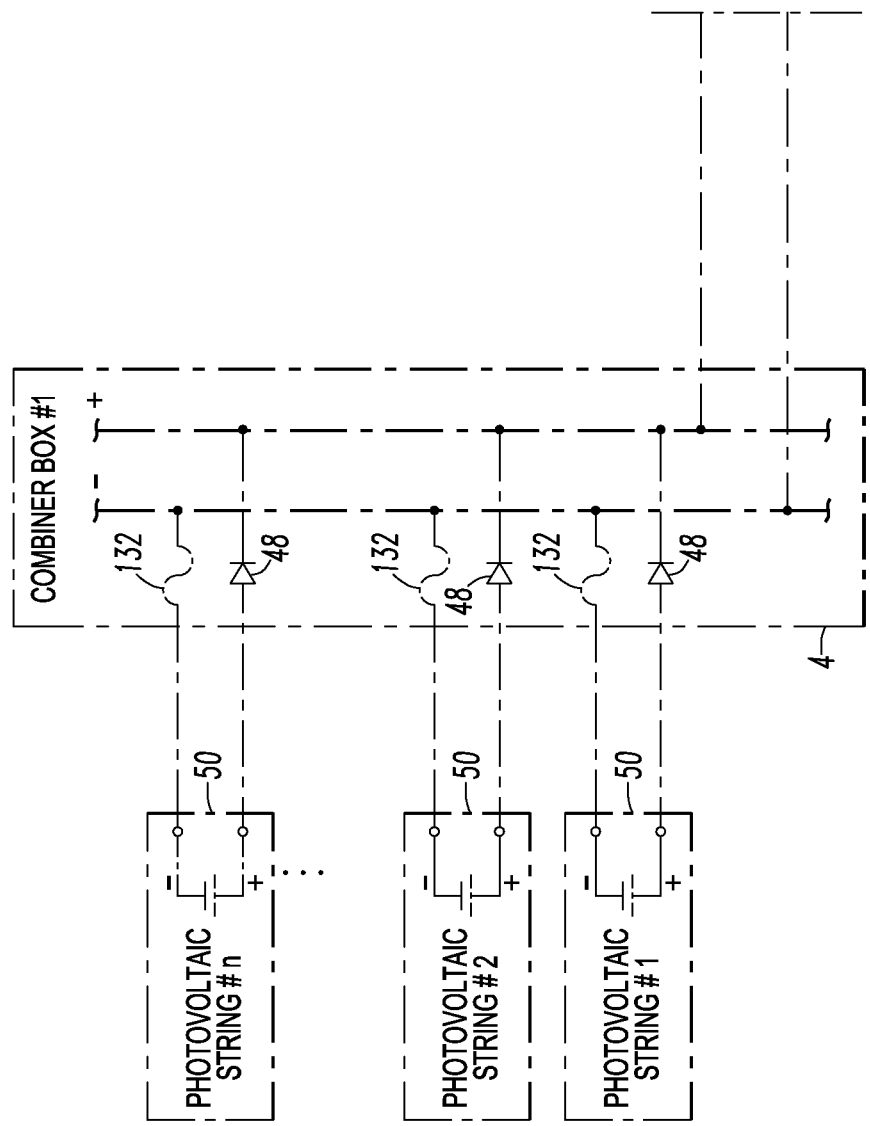

US 8,508,896 B2

DC FEEDER PROTECTION SYSTEM

BACKGROUND

1. Field

The disclosed concept pertains generally to direct current (DC) power systems and, more particularly, to protection systems for feeders between combiner boxes and inverters.

2. Background Information

Solar and other renewable energy solutions involve power production at a direct current (DC) level and conversion to alternating current (AC) for usage with traditional electrical load devices. As one example, due to the distribution of DC power production from many solar panels, these many sources of DC power are combined via electrical conductors and other electrical connections. These many sources are combined and there is potential for back feeding from adjoining power sources into DC faults that may result from, for example, faulty construction, wear and tear, and environmental stresses.

The National Electric Code provides guidelines to prevent such back feeding via the use of fuses or circuit breakers at the connection point of each string of solar panels into a combiner box. The power that is combined within the combiner box is then distributed to a DC-to-AC inverter that converts the DC power to AC power. This connection between the combiner box and the inverter has limited known protection schemes available and/or in use. One known system design allows for relatively small DC faults within a string of solar panels to exist without interruption by an electrical protective device. These relatively small faults may not progress as in traditional faults since the source of energy, the sun, disappears in the evening, therefore allowing overheated insulation to cool, and then re-heats during the next day. This cycling affect of the energy source, the sun, does not allow for the relatively fast transition from a small fault into a larger fault that would be interrupted by an electrical protective device. Should these string faults grow, they would be back-fed from other photovoltaic (PV) strings and the required fuse would open and therefore isolate one leg of the faulted string. However, known designs do not provide any protection for the second leg of the faulted string.

When an existing low level fault exists on one of the two legs within the string and a second fault occurs between the combiner box and the inverter, there is potential for an ongoing fault condition which will not be interrupted by known electrical protective devices. In addition, known solar system designs do not have any mechanism to isolate the source of DC power generation, as long as the sun is shining. A known method to terminate the energy generation would be to "cover" the solar panels from the sun light, which is not practical. Other possibilities include DC/DC converters and rooftop disconnects which have a remote shutdown feature, although for relatively larger PV systems the cost becomes excessive.

Protection of PV arrays presents unique challenges that stem from the limited output nature of photovoltaic sources (i.e., their output current into a short circuit is only slightly higher than full load current). Furthermore, since the output under both load and short circuit is directly related to irradiance, under less than full sun the output into a fault may be significantly less than normal load conditions. Considering that all overcurrent devices must be sized based on maximum short circuit current, it quickly becomes evident that conventional time-overcurrent protection (e.g., fuses; conventional circuit breakers) is insufficient, and a more advanced method of fault detection is needed.

Arc fault circuit interruption (AFCI) protection was recently accepted for NEC 2011.

Ground fault circuit interruption (GFCI) protection is also required by the NEC, but is typically implemented only at the inverter at one end and one location of the DC feeder.

There is room for improvement in DC feeder protection systems.

SUMMARY

These needs and others are met by embodiments of the disclosed concept, which detects a number of a directional current fault, a differential current fault, and a residual current fault for a direct current (DC) feeder.

In accordance with one aspect of the disclosed concept, a direct current feeder protection system comprises: a first conductor; a second conductor; a third conductor; a fourth conductor; a fifth conductor; a sixth conductor; a first current sensor structured to sense first current flowing in the first conductor; a second current sensor structured to sense second current flowing in the second conductor; a third current sensor structured to sense third current flowing in the third conductor; a fourth current sensor structured to sense fourth current flowing in the fourth conductor; four circuit interrupters structured to interrupt currents flowing in the first, second, third and fourth conductors; and a processor cooperating with the first, second, third and fourth current sensors to input the sensed first, second, third and fourth currents, respectively, and to output a number of commands to the four circuit interrupters, the processor comprising a routine structured to detect a number of: a directional current fault of the sensed first, second, third or fourth currents, a differential current fault of the sensed first and third currents or the sensed second and fourth currents, and a residual current fault of the sensed first and second currents or the sensed third and fourth currents, and to responsively output the number of commands, wherein the first, fifth and third conductors are electrically connected in series with two of the four circuit interrupters, and wherein the second, sixth and fourth conductors are electrically connected in series with the other two of the four circuit interrupters.

As another aspect of the disclosed concept, a direct current feeder protection system is for use with a combiner box and an inverter. The direct current feeder protection system comprises: a first conductor; a second conductor; a third conductor; a fourth conductor; a fifth conductor; a sixth conductor; a first current sensor structured to sense first current flowing in the first conductor from the combiner box; a second current sensor structured to sense second current flowing in the second conductor to the combiner box; a first two-pole circuit interrupter structured to interrupt currents flowing in the first and second conductors; a third current sensor structured to sense third current flowing in the third conductor to the inverter; a fourth current sensor structured to sense fourth current flowing in the fourth conductor from the inverter; a second two-pole circuit interrupter structured to interrupt currents flowing in the third and fourth conductors; and a processor cooperating with the first, second, third and fourth current sensors to input the sensed first, second, third and fourth currents, respectively, and to output a number of commands to the first and second two-pole circuit interrupters, the processor comprising a routine structured to detect a number of: a directional current fault of the sensed first, second, third or fourth currents, a differential current fault of the sensed first and third currents or the sensed second and fourth currents, and a residual current fault of the sensed first and second currents or the sensed third and fourth currents, and to responsively output the number of commands, wherein the first, fifth and third conductors are electrically connected in series with a first pole of each of the first and second two-pole circuit interrupters, and wherein the second, sixth and fourth conductors are electrically connected in series with a second pole of each of the first and second two-pole circuit interrupters.

BRIEF DESCRIPTION OF THE DRAWINGS

A full understanding of the disclosed concept can be gained from the following description of the preferred embodiments when read in conjunction with the accompanying drawings in which:

FIGS. 1A and 1B form a block diagram in schematic form of a direct current feeder protection system in accordance with embodiments of the disclosed concept.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; a programmable logic controller (PLC); a plurality of distributed processors; or any suitable processing device or apparatus.

The disclosed concept is described in association with photovoltaic (PV) strings, although the disclosed concept is applicable to a wide range of DC power sources for solar, wind and other applications, and a wide range of DC feeder circuits.

Figure 1B:
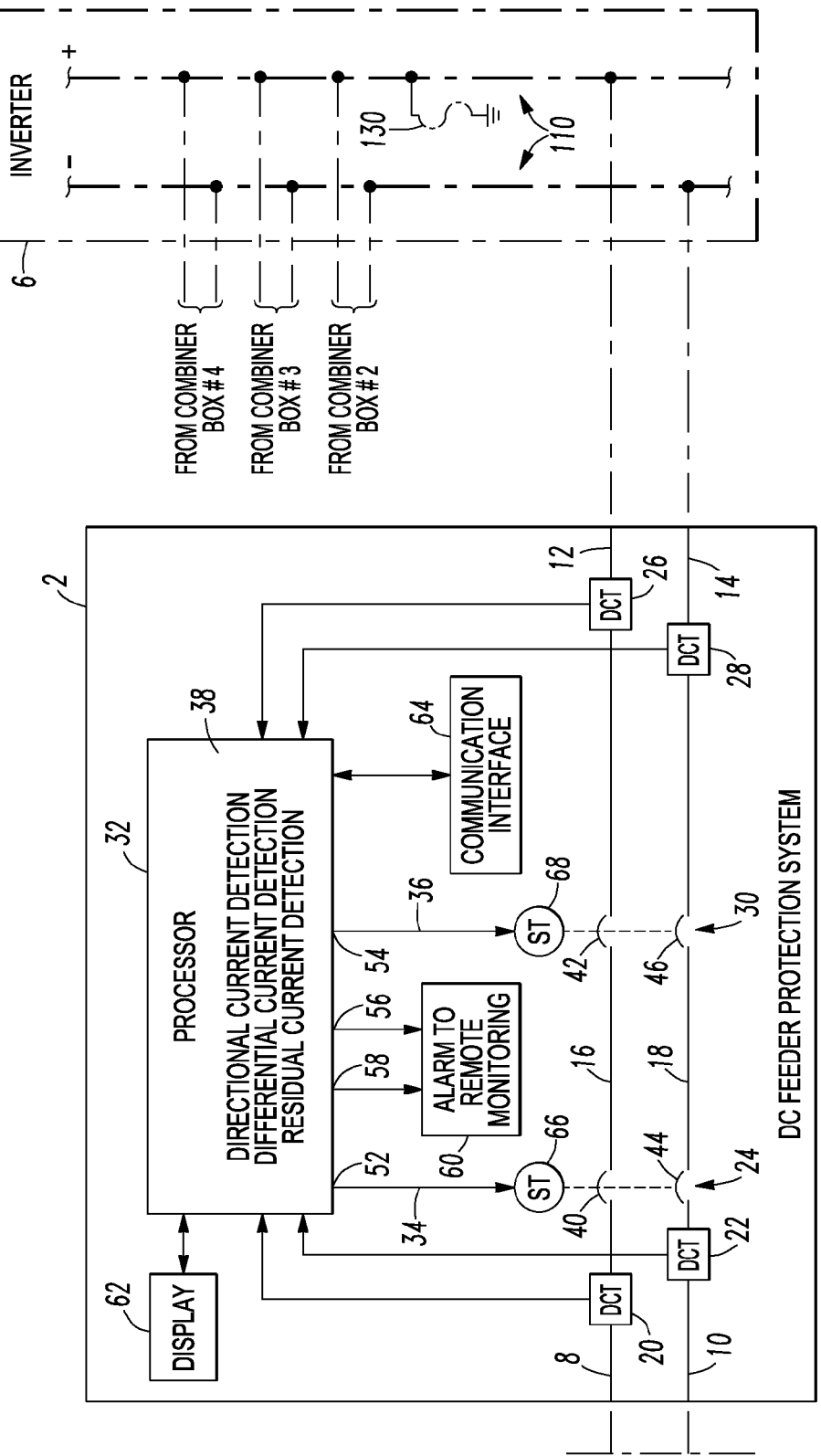

FIGS. 1A-1B show a direct current (DC) feeder protection system 2 for use with a combiner box 4 and an inverter 6. The DC feeder protection system 2 includes a first conductor 8, a second conductor 10, a third conductor 12, a fourth conductor 14, a fifth conductor 16 and a sixth conductor 18. A first current sensor (DCT) 20 is structured to sense first current flowing in the first conductor 8 from the combiner box 4. A second current sensor (DCT) 22 is structured to sense second current flowing in the second conductor 10 to the combiner box 4. A first two-pole circuit interrupter 24 is structured to interrupt currents flowing in the first and second conductors 8,10 in connection with the respective DCTs 20,22. A third current sensor (DCT) 26 is structured to sense third current flowing in the third conductor 12 to the inverter 6. A fourth current sensor (DCT) 28 is structured to sense fourth current flowing in the fourth conductor 14 from the inverter 6. A second two-pole circuit interrupter 30 is structured to interrupt currents flowing in the third and fourth conductors 12,14 in connection with the respective DCTs 26,28. A processor 32 cooperates with the DCTs 20,22,26,28 to input the sensed first, second, third and fourth currents, respectively, and to output a number of commands 34,36 (e.g., one or more commands; two example commands 34,36 are shown; any suitable number of commands) to the first and second two-pole circuit interrupters 24,30.

The processor 32 includes a routine 38 structured to detect a number of: (a) a directional current fault of the sensed first, second, third or fourth currents; (2) a differential current fault of the sensed first and third currents, or the sensed second and fourth currents; and (3) a residual current fault of the sensed first and second currents, or the sensed third and fourth currents, and to responsively output the number of commands 34,36.

The first, fifth and third conductors 8,16,12, which form a "positive" conductor, are electrically connected in series with a first pole 40,42 of each of the respective first and second two-pole circuit interrupters 24,30. The second, sixth and fourth conductors 10,18,14, which form a "negative" conductor, are electrically connected in series with a second pole 44,46 of each of the respective first and second two-pole circuit interrupters 24,30. Alternatively, the poles 40,42,44,46 can be four independent circuit interrupters (not shown) or any suitable electrical switching apparatus.

Example 1

The example combiner box 4 can include a plurality of blocking diodes 48, each of which corresponds to input from a corresponding direct current power source, such as the example PV strings 50. The protection provided by the disclosed concept plus the example blocking diodes 48 will be compared to a known system with minimum protection for nine fault conditions as are discussed below in connection with Examples 22-30. The inclusion of the blocking diodes 48 in the analysis is due to their use in some photovoltaic systems, although such blocking diodes are not required.

Example 2

The example first, second, third and fourth current sensors 20,22,26,28 are bipolar direct current transducers (DCTs). This can include, for example and without limitation, a shunt 100 and an isolation amplifier 102 as will be discussed in connection with FIG. 2A, a Hall effect sensor (not shown), or any suitable device that can produce the desired current signals with suitable accuracy.

Example 3

The example two-pole circuit interrupters 24,30 can be structured to be opened manually or opened in response to an external signal (not shown). For example, in addition to primary protection functions of the processor routine 38, the DC feeder protection system 2 can include provisions for manual opening of the four poles 40,42,44,46. This can be accomplished by accepting an input signal (not shown) which will cause those poles to be opened. The input signal can originate either locally or remotely, from an operator or other external trigger, in order to allow part of a PV array (e.g., without limitation, the DC feeder in connection with conductors 8,10, 12,14) to be taken out of service while the remainder of the PV array from other combiners continues in operation.

This manual opening feature for multiple feeders (not shown, but including, for example and without limitation, other DC feeder protection systems for other combiner boxes feeding the inverter 6) can be tied back to a common emergency trip station (not shown) such that a single input from an emergency response person will isolate all feeders at both ends, thereby effectively reducing the PV energy available at any single point in the system. This emergency trip feature could also be initiated automatically by a building fire alarm system (not shown), via contact output (not shown), to sectionalize the PV array in the event of fire unrelated to the overall PV power system. The remote opening feature further enhances operator safety.

Example 4

As will be discussed, below, in connection with FIGS. 4A-4C and 5, the processor routine 38 can be structured to detect each of the directional current fault, the differential current fault, and the residual current fault.

Example 5

In one embodiment, the processor 32 can be a programmable logic controller (PLC), although a wide range of processors can be employed.

Example 6

The processor 32 can include a number of first outputs 52,54 to provide the number of commands 34,36. The processor 32 can also include a number of second outputs 56 structured to indicate a trip status of the circuit interrupters 24,30.

Example 7

The processor 32 can further include an output 58 structured to indicate that the DC feeder protection system 2 is functional. For example, for system monitoring (e.g., without limitation, by a remote monitoring device or system 60), an output contact can be held closed as long as the processor 32 is running (e.g., without limitation, no processor errors exist; no low battery conditions exist) in order to provide an indication that the system 2 is functional (e.g., healthy).

Example 8

The processor 32 can include a display 62 (e.g., without limitation, an LCD display; any suitable human machine interface (HMI) device) to display one, some or all of the following: (1) the directional current fault; (2) the differential current fault; (3) the residual current fault; (4) a status of the circuit interrupters 24,30; (5) the sensed first, second, third and fourth currents at a time of a trip; (6) two differential current values; and (7) two residual current values. However, the disclosed system 2 is intended to operate without operator intervention with protection functionality being independent of any optional operator interface display. Preferably, a suitable operator interface is provided with a number of input members (not shown), such as touchpad buttons, for monitoring status of the system 2 and to allow the system to be reset after a protective operation. For example, touchpad buttons can allow the operator to scroll through various display screens (not shown), and to reset trip lockout of the system 2 following any detected fault.

For example and without limitation, a base screen (not shown) can display the status of the circuit interrupters 24,30 (e.g., open; closed; tripped) and the level of current from the DCTs 20,22,26,28 at the four disclosed sensing locations (FIG. 1B). When selected, a supplemental screen (not shown) can display the residual and differential current levels, which is useful for set-up and commissioning of the system 2. In the event of a detected fault and subsequent trip, a series of screens (not shown) can indicate each of the protective function elements that has operated, and the current at each sensing location at the time of trip.

A comprehensive status display can further enhance operator safety and provide service personnel with information to diagnose, identify and locate a fault.

Example 9

The processor 32 can include a suitable communication interface 64 structured to communicate to a remote location (not shown) one, some or all of the following: (1) the directional current fault; (2) the differential current fault; (3) the residual current fault; (4) a status of the circuit interrupters 24,30; (5) the sensed first, second, third and fourth currents at a time of a trip; (6) two differential current values; and (7) two residual current values. However, the disclosed system 2 is intended to operate without such communication with protection functionality being independent thereof. Remote monitoring of the DC feeder protection system 2 can enable, for example, remote alarming, remote diagnostics, and comparison of power output performance between different feeders.

Example 10

The two example two-pole circuit interrupters 24,30 include shunt trip (ST) devices 66,68 responsive to the respective number of commands 34,36. The STs 66,68 allow the poles 40,42,44,46 to be tripped by the processor 32, for example, by energizing a ST coil (not shown).

Example 11

Figure 2A:
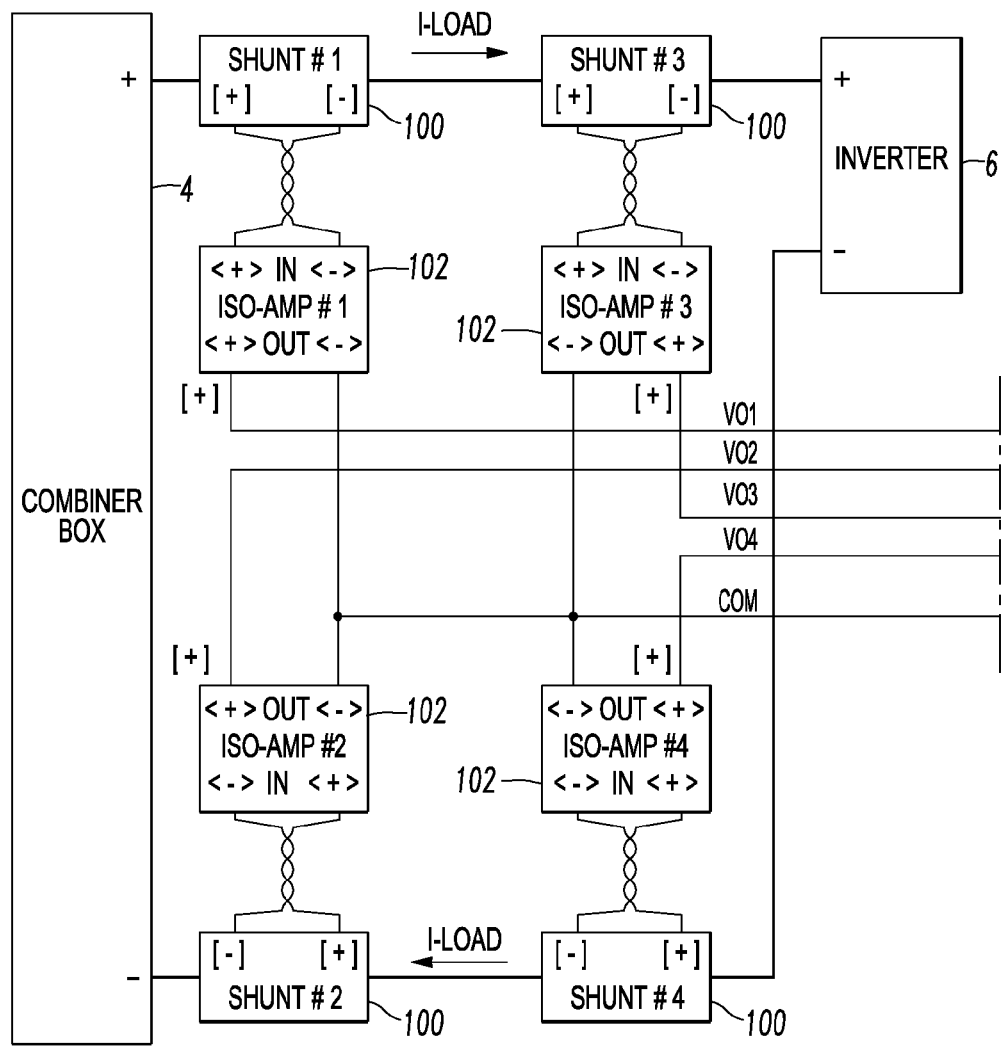
FIGS. 2A-2B form a block diagram in schematic form showing current sensing and analog current summation in accordance with an embodiment of the disclosed concept.
Figure 2B:
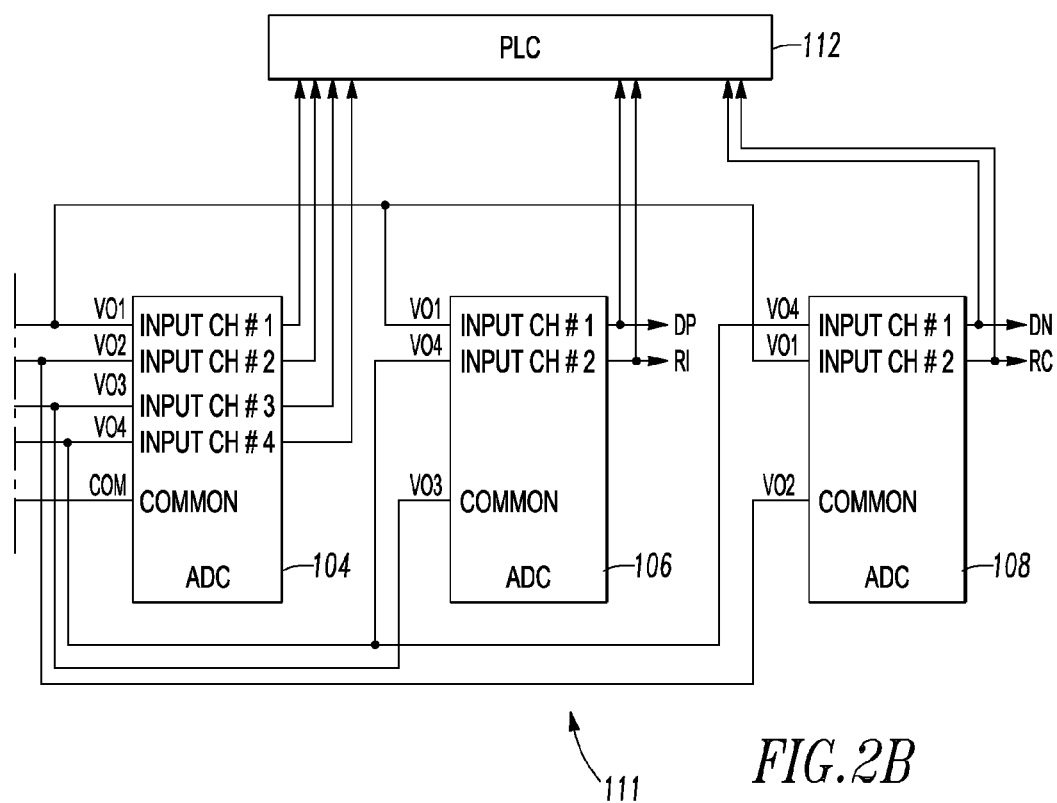

FIGS. 2A-2B show current sensing and analog current summation in which the DCTs 20,22,26,28 of FIG. 1B are each shown as a shunt 100 and an isolation amplifier 102 (ISO-AMP). In FIG. 2A, "[+]" designates signal polarity with normal current, and "<+>" designates a device polarity mark, in order that all values are positive during normal operation for directional protection. Otherwise, a negative current indicates reverse current flow.

Each of the isolation amplifiers 102 includes an input electrically connected to the corresponding shunt 100 and an output having a voltage (V01,V02,V03,V04) proportional to a corresponding one of the sensed first, second, third and fourth currents. The processor 32 (FIG. 1B) can include three example analog to digital converter (ADC) modules 104,106, 108. The first ADC module 104 inputs V01,V02,V03,V04 and COM from the four isolation amplifiers 102 and provides V01,−V02,−V03,V04 to the processor 32 (FIG. 1B) corresponding to the respective first, second, third and fourth currents as were discussed, above, in connection with FIG. 1B.

The second ADC module 106 on its first channel (INPUT CH #1) measures positive conductor differential (DP), which is an output having the signal DP proportional to differential current of the first and third conductors 8,12 (FIG. 1B), and its second channel (INPUT CH #2) measures inverter end residual (RI), which is an output having the signal RI proportional to residual current of the third and fourth conductors 12,14 (FIG. 1B).

The third ADC module 108 on its first channel (INPUT CH #1) measures negative conductor differential (DN), which is an output having a signal DN proportional to differential current of the second and fourth conductors 10,14, and its second channel (INPUT CH #2) measures combiner box end residual (RC), which is a signal RC proportional to residual current of the first and second conductors 8,10. The processor routine 38 is structured to detect the differential current fault from the first output DP,DN of the ADC modules 106,108, and to detect the residual current fault from the second output RI,RC of the ADC modules 106,108.

It will be appreciated that the ADCs 106,108 function as summers for the DCTs 20,22,26,28. In particular, a first summer (e.g., INPUT CH #2 of ADC 106) provides a first residual current signal RI to the processor 32, a second summer (e.g., INPUT CH #2 of ADC 108) provides a second residual current signal RC to the processor 32, a third summer (e.g., INPUT CH #1 of ADC 106) provides a first differential current signal DP to the processor 32, and a fourth summer (e.g., INPUT CH #1 of ADC 108) provides a second differential current signal DN to the processor 32. The processor routine 38 is structured to determine the residual current fault from the first or second residual current signals RI,RC, and to determine the differential current fault from the first or second differential current signals DP,DN. The residual or differential current fault is detected when the residual or differential current, respectively, exceeds a predetermined value for a predetermined time.

Example 12

The ADC 104 includes four outputs (e.g., from INPUT CH #1,2,3,4) and four inputs (for V01,V02,V03,V03) inputting those voltage signals corresponding to the sensed first, second, third and fourth currents. For each of the four outputs, the processor routine 38 is structured to detect the reverse current fault from a corresponding one of the four outputs. The reverse current fault is detected when the corresponding one of the four outputs exceeds a predetermined value for a predetermined time.

Example 13

The disclosed DC feeder protection system 2 protects against a variety of fault types impacting DC feeders that connect individual combiner boxes, such as 4, to an inverter DC bus 110 (FIG. 1B). This system 2 continuously monitors the operation of the combiner box to inverter feeders, and automatically disconnects the feeder at both ends when any abnormal operation is detected. This prevents such a condition from escalating and causing severe damage to the surrounding structure. This protection results from detection of a fault condition by one, two or all three of three protective functions as will be described.

On detection of a fault condition, the system 2 opens the poles 40,42,44,46 at both ends of the feeder. After the trip occurs, the system 2 maintains a trip signal to the circuit interrupters 24,30 until the trip is acknowledged, and the system 2 is reset by an operator.

Example 14

The DC feeder protection system 2 provides three basic protective functions, each with multiple elements. Each element is independently settable for both pick-up threshold and tripping delay. Any specific fault type and location will trigger a response from multiple functions and multiple elements. The redundancy of the protective functions and elements provides for a relatively higher reliability in detecting faults than known prior systems. Each protective trip element is flagged separately, thereby allowing analysis of the combination of elements that operated due to an individual incident to help identify the fault type and location. The three protective functions are separate from, but further enhance, other protection available for PV systems such as arc fault circuit interruption (AFCI) protection that was recently accepted for NEC 2011.

Example 15

The first protective function is residual current detection. Residual current is defined as the difference between the positive and negative current at either end for the feeder. Under normal conditions, DC current will circulate in the system conductors in a closed loop such that the positive and negative conductors carry equal magnitude in opposite directions. If current in either leg is diverted through an unintended path (e.g., typically to ground), then this residual will be non-zero. When the level of the residual current exceeds a corresponding pick-up threshold for a corresponding time, then the system 2 will initiate a trip of both circuit interrupters 24,30 associated with each end of the faulted feeder.

Two residual elements are provided, one at each end of the feeder. Under normal operation, power flow is from the PV array (e.g., at combiner box 4) to the inverter 6. If the diversion fault is located on the feeder, then it will be detected only at the inverter end. However, if the diversion is located ahead of the feeder (in the combiner box 4 or PV array supplying it), then it will be detected at both ends. The residual function detects diversion faults on the grounded conductor as well as on the ungrounded conductor.

Example 16

The second protective function is differential current detection. Differential current is defined as the difference between the current measured at opposite ends of the same conductor. Under normal conditions, DC current will circulate in the system conductors in a closed loop from the combiner box 4 to the inverter 6 such that the current at both ends of a conductor is equal in magnitude and in the same direction. If an unintended path (fault) causes current to flow outside this loop, then the differential will be non-zero. When the level of the differential current exceeds a corresponding pick-up threshold for a corresponding time, then the system 2 will initiate a trip of both circuit interrupters 24,30 associated with the faulted feeder.

Two differential elements are provided, one for the positive conductor and one for the negative conductor, allowing identification of the faulted conductor. The differential function is primarily intended to detect and operate for high resistance positive to negative faults along the feeder, in which case both the positive and negative elements will operate. However, should a single leg be faulted to a diversion path (typically ground), only the protective element on that leg will operate. However, since the example circuit interrupters 24 or 30 are multi-pole devices, both legs will always be opened on any trip, regardless which number of elements operate.

Example 17

The third protective function is directional current detection. Directional current is defined as current that flows in the direction opposite to the normal flow of power from the combiner box 4 to the inverter 6. Four elements are provided to monitor the direction of current flow at each end of both the positive and negative conductors. When current above a corresponding pickup threshold for a corresponding time is detected in the reverse direction at any one of these locations, the system 2 will initiate a trip of both circuit interrupters 24,30 associated with the faulted feeder.

The directional function is primarily intended to detect low resistance faults (e.g., a dead short) within the combiner box 4, or in the PV array supplying it. In the event of a positive to negative short in the combiner box 4 or PV array, the current will reverse in both legs at both ends of the feeder due to back feed from other combiner box sources. This function will also detect positive to negative short circuits in the feeder, but the current will only reverse at the inverter end due to the back feed from other combiner box sources. Short circuits between the ungrounded conductor and ground will be detected only on the ungrounded conductor element, at one or both ends depending on the location of the fault.

Example 18

FIG. 2B shows an example analog summation circuit 111. In this example, the processor 32 of FIG. 1B is a programmable logic controller (PLC) 112 (FIG. 2B), which inputs the eight input channels of the ADCs 104,106,108. Here, the PLC 112 monitors the four currents (positive and negative at both ends of the feeder) and the DP,DN,RI,RC signals.

Alternatively, the processor 32 or a suitable PLC (not shown) can input the four currents via analog signals, and then do the residual and differential summation digitally therein. However, certain ADC modules do not read the four signals simultaneously, thereby making a digital summation impossible unless the DC current is constant. Since the nature of the system would be a varying output, any instantaneous summation of two ADC channels would produce a non-zero result and a nuisance trip. By summing the signals on the analog side (FIGS. 2A-2B), this problem is avoided. The three example separate ADC modules 104,106,108 are employed to allow for three isolated signal commons, which are employed to perform this analog summation with the four isolation amplifiers 102.

The four example DCTs 20,22,26,28 (FIG. 1B) output voltage signals V01,V02,V03,V04, which are proportional to IP1,IP2,IN1,IN2, respectively. RC and RI are the residual currents at the ends of the feeder (the end at the combiner box 4 and the end at the inverter 6, respectively). DP and DN are the differential currents on the positive and negative conductors, respectively. In the analog summation embodiment (FIGS. 2 and 4A-4C), the values are derived by measuring pairs of voltages that represent currents at two locations in the circuit. The voltages are measured on the ADCs 106,108 by using one of the voltage signals as the common (reference) for that module. The two ADCs 106,108 use different respective common references V03,V02, in order to allow different combinations to be measured. For example, DP (positive differential current) is equal to IP1-IP2, which is sensed on ADC 106 by taking voltage V03 (the voltage proportional to the current at the inverter end of the positive conductor) as the common Hence, the first input channel "sees" (inputs) V01-V03 (where V01 is the voltage proportional to the positive current at the combiner box end). The polarity of the voltage representing each current is such that the V01 to V03 resultant voltage represents a differential current. The second input channel of this module then "sees" (inputs) V04-V03, which is the resulting voltage for the summation of the voltages that represent the currents at the inverter ends of the positive and negative conductors. Hence, that is the residual summation at the inverter end.

Analog summations are done by the way the outputs of the isolation amplifiers 102 are connected to the ADCs 104,106, 108. Each output is a voltage that is proportional to the current in the connected shunt 100. The four isolation amplifiers 102 are tied in common at the output negative (COM) which is also connected to ADC 104 common. Each output positive is connected to a separate channel of ADC 104, in order to provide voltages proportional to the four measured currents for general metering and detecting reverse flow (or for a digital summation using suitable hardware). The polarity of the connection between the corresponding shunt 100 and the isolation amplifier 102 produces a positive output voltage on all channels with current flow in the normal direction.

On ADC 106, V03 is connected to COMMON, which is the "inverter end positive" node. The first channel (INPUT CH #1) input is connected to V01, the combiner box positive node, therefore the voltage from V01 to V03 measures the sum of the positive current at both ends in opposing polarity (i.e., the voltage imposed on INPUT CH #1 to COMMON is proportional to the positive differential current). The second channel (INPUT CH #2) input is connected to V04, the inverter end negative node, therefore the voltage from V04 to V03 measures the sum of the inverter end positive and negative current (i.e., the voltage imposed on INPUT CH #2 to COMMON is proportional to the inverter end residual current).

Similar connections are made on ADC 108 using V02 as the common to measure the negative differential on INPUT CH #1 and the combiner end residual on INPUT CH #2.

The analog summations are done by the way the outputs of the isolation amplifiers 102 are connected to the ADCs 104, 106,108. Each output is a voltage that is proportional to the current in the connected shunt.

Example 19

Figure 3:
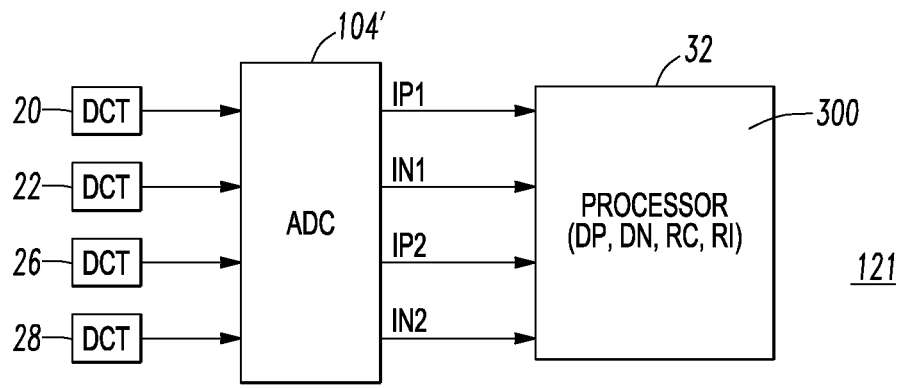
FIG. 3 is a block diagram in schematic form showing current sensing and digital current summation in accordance with another embodiment of the disclosed concept.

Referring to FIG. 3, a digital summation circuit 121 is shown for the processor 32 of FIG. 1B. The circuit 121 includes a suitable ADC 104', which can be functionally the same as or similar to the ADC 104 of FIG. 2B. In FIG. 3, for RC,RI (residual) and DP,DN (differential) for the digital summation, the values IP1,IP2,IN1,IN2 are measured simultaneously and converted to digital equivalents. The residual and differential values are calculated from digital values representing IP1,IP2,IN1,IN2:

$DP=IP1-IP2$;

$DN=IN1-IN2$;

$RC=IP1-IN1$; and $RI=IP2-IN2$.

These equations assume that the values of IP1,IP2,IN1,IN2 are taken simultaneously such that the summation (or subtraction) as discussed, above, is provided by the processor 32. Differential current (DP,DN) is measured/calculated on both of the positive and negative conductors independently. Residual current (RC,RI) is measured/calculated at both ends of the feeder.

The directional (reverse) current is measured directly on ADC 104' and is compared to a reference (pick-up) value. Each of the four measured values is treated separately. This function does not require any comparison between measured values so it is the same in both the analog summation (Example 18) and digital summation (Example 19) embodiments.

Example 20

Figure 4A:
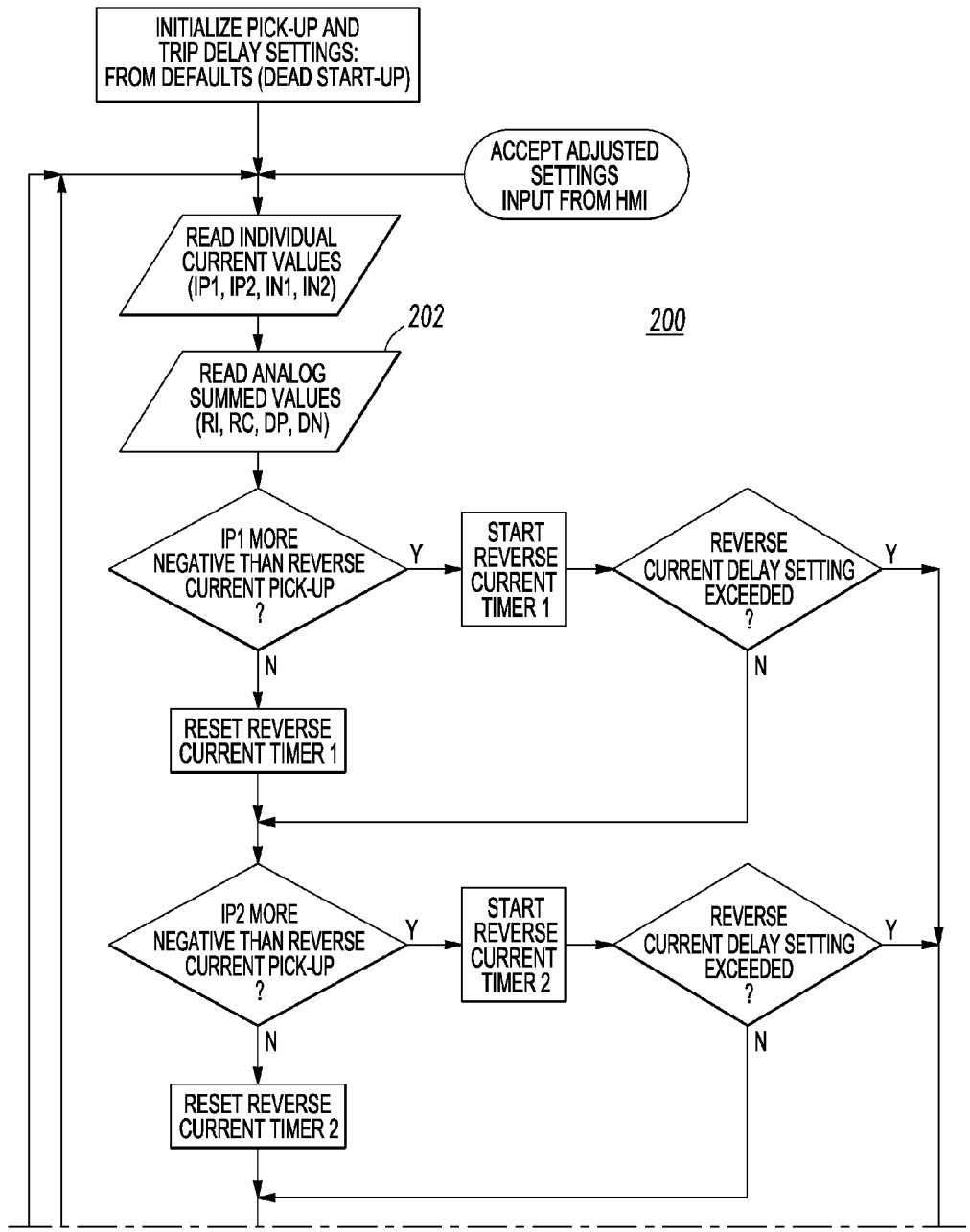
FIGS. 4A-4C form a flowchart of a processor routine for the analog current summation of FIG. 2B.
Figure 4B:
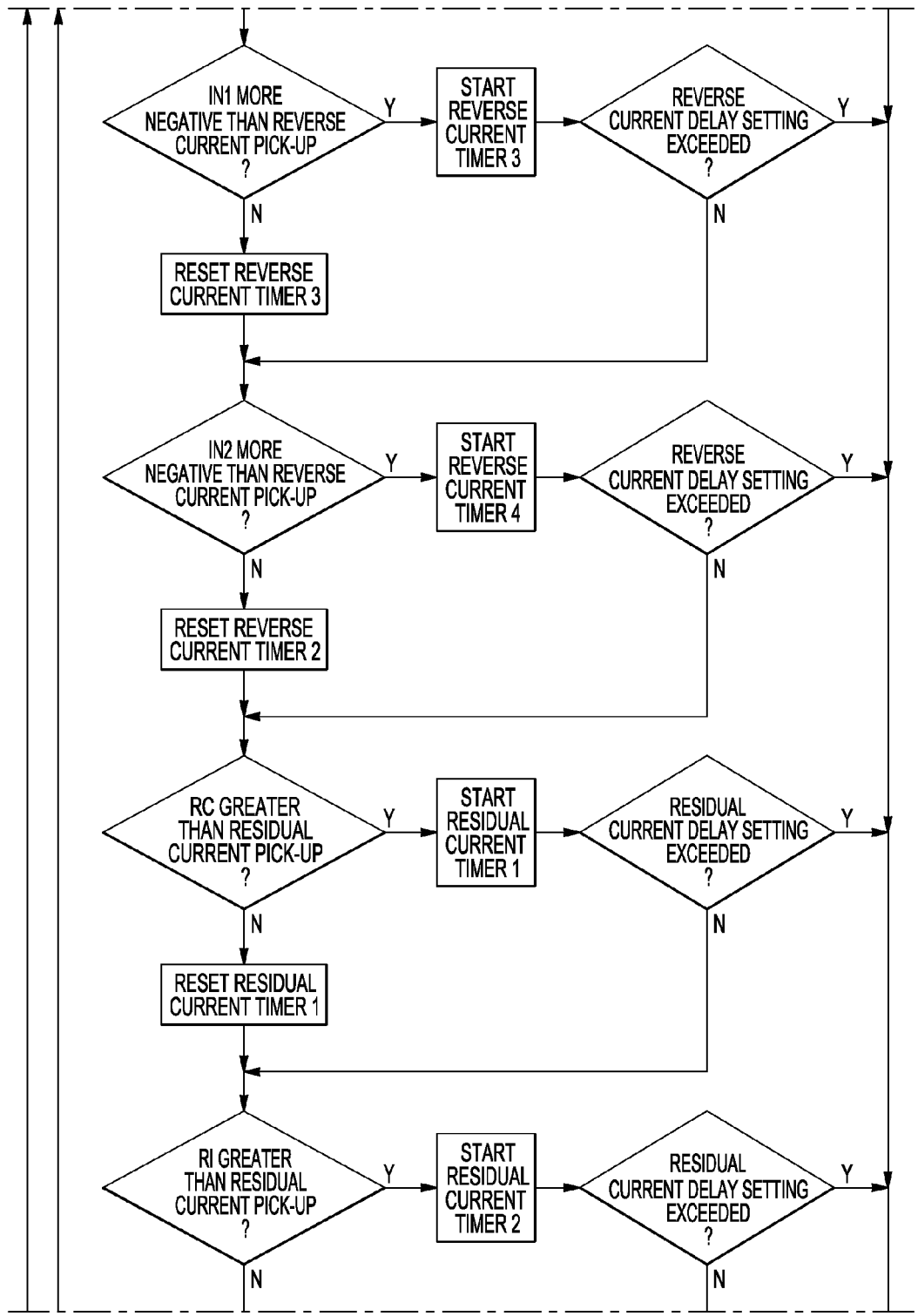
Figure 4C:
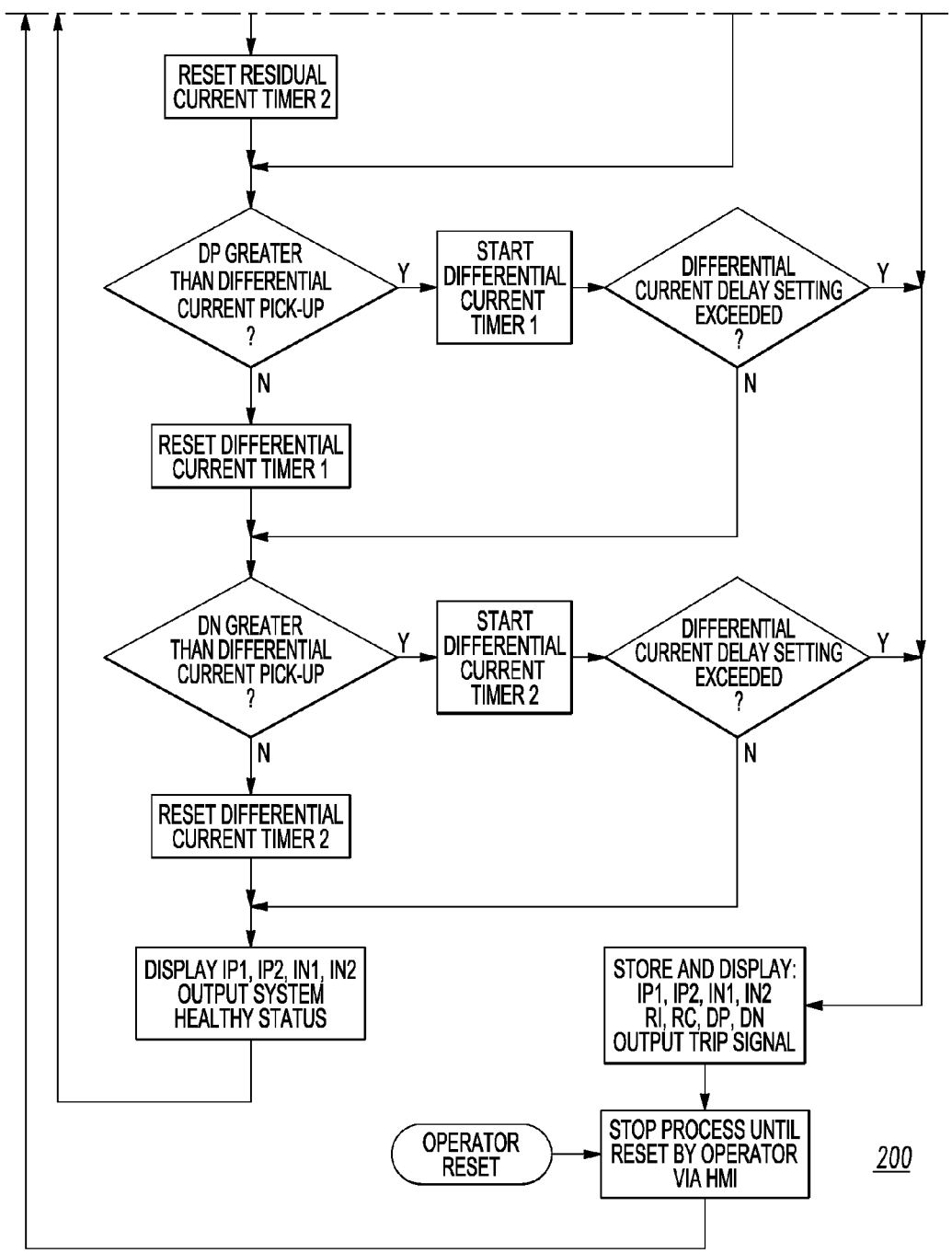

FIGS. 4A-4C show a processor routine 200 for the analog summation (Example 18) of FIG. 2B. Suitable PLC ladder logic (not shown) can be employed. For example, digital summation logic (not shown) can perform calculations to convert raw digital values of current for display in amperes. Analog summation logic (not shown) can include logic to flag all protective elements that operated on a given event and capture the current as raw data, but does not do the conversion to amperes. The following is a description of logic modules that provide protection logic.

Reverse Current (four elements) monitors each of the four currents as a signed value, with normal being positive, and does a numeric comparison to a negative threshold value and trips if the measured value is less than the threshold.

Differential and Residual using Analog Summation (two residual and two differential elements) monitors the value of each of the four signals resulting from the analog summation of two currents in pairs that represent residual or differential current, and compares the absolute value of each measurement to a threshold and trips if the measured value exceeds the threshold.

Alternatively, Differential and Residual using Digital Summation (two residual and two differential elements) monitors the four current values and performs four subtractions of pairs of signals to determine each differential or residual current, and compares the absolute value of each result to a threshold value and trips if that value exceeds the threshold.

After a protective element operates, the trip and logging logic is activated. The Trip and Logging Logic closes a pair of output contacts to initiate circuit interrupter tripping via the shunt trip devices (ST 66,68 of FIG. 1B), and closes another to provide a trip status (from output 56 of FIG. 1B). Simultaneously, this sets a flag for each element that operated for display on the display 62 (e.g., HMI) (FIG. 1B), and moves the last measured and/or calculated value to a storage location for display of currents at the time of trip. The trip outputs are held closed until reset via the display 62. Resetting the trip also clears the stored values of current.

Example 21

Figure 5:
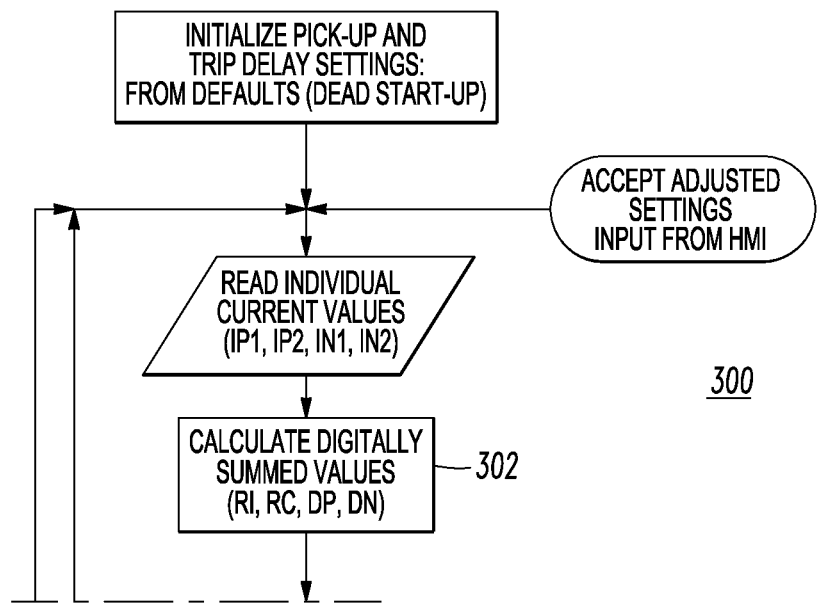
FIG. 5 is a flowchart of a processor routine for the digital current summation of FIG. 3.

FIG. 5 shows a portion of processor routine 300 for the digital current summation of FIG. 3. Here, unlike the ADCs 106,108 of FIG. 2B, the processor routine 300 at 302 is structured to subtract first and second current values to provide a first residual current signal RC, to subtract third and fourth current values to provide a second residual current signal RI, to subtract first and third current values to provide a first differential current signal DP, to subtract second and fourth current values to provide a second differential current signal DN, to determine a residual current fault from the first or second residual current signals RC,RI, and to determine a differential current fault from the first or second differential current signals DP,DN. See, for example, Example 19. Otherwise, the routine 300 is similar to the routine 200 of FIGS. 4A-4C. In contrast, at 202 of FIG. 4A, the routine 200 reads the values DP,DN,RC,RI from the ADCs 106,108 of FIG. 2B.

In FIGS. 4A-4C and 5, examples of the reverse current pick-up and reverse current delay settings depend upon the desired sensitivity of the protection and the selected hardware. Non-limiting examples are a 2 A reverse current pick-up and a ½ second delay. Non-limiting examples for residual current are a 4 A residual current pick-up and a ½ second delay. Non-limiting examples for differential current are a 4 A differential current pick-up and a ½ second delay.

Example 22

For a positive to ground fault on one of the PV strings 50 (prior to input by the combiner box 4 of FIG. 1A), a conventional PV array system will likely result with a fault current, $I_{FAULT}$, determined by the current division between a ground path resistance, $R_{GROUND}$, and the resistance of the intended positive conductors, $R_{CONDUCTOR}$, where typically $R_{GROUND} > R_{CONDUCTOR}$. The fault can be supplied by all PV strings 50 in the PV array, including backfeed from other combiner boxes (not shown). The fault current is given by Equation 1:

$$I_{FAULT} = (R_{CONDUCTOR}/R_{GROUND}) \times (I_{PV1} + I_{PVn}) \quad \text{(Eq. 1)}$$

wherein:

$I_{PV1}$ is current from a first PV array; and $I_{PVn}$ is combined current from all other strings in the array. Here, an example 4 A inverter ground fuse 130 (FIG. 1B) is likely to open to clear the fault, but will provide no information as to the location of the problem.

For the disclosed concept, the likely result is $I_{FAULT}$ will be determined by the current division between the ground path resistance and the resistance of the intended positive conductors, where typically $R_{GROUND} > R_{CONDUCTOR}$. The fault can only be supplied by the faulted PV string due to the blocking diode 48 (FIG. 1A) and will persist. The fault current is given by Equation 2, and will typically be less than one-half of the PV string output:

$$I_{FAULT} = (R_{CONDUCTOR}/R_{GROUND}) \times I_{PV1} \quad \text{(Eq. 2)}$$

Here, the 4 A inverter ground fuse 130 is not likely to open, and the system 2 will continue to operate at full output.

A ground alarm can be provided from the DC feeder protection system 2 indicating which combiner box is affected. The individual PV string 50 can be identified manually. For example, manual detection is performed by one of two methods: (1) isolating individual strings until the fault is removed from the system; and (2) using a DC clamp-on ammeter on the positive and negative conductors of a string to identify the faulted string in a manner similar to "zero sequence" ground detection in AC systems. Alternately, the feeder could be tripped which would mitigate the fault by opening the ungrounded conductor circuit, but would reduce system output.

Example 23

For a negative to ground fault on one of the PV strings 50 (prior to input by the combiner box 4 of FIG. 1A), a conventional PV array system will likely result with $I_{FAULT}$ determined by the total capacity of all PV strings 50 in the PV array including backfeed from all other combiner boxes (not shown). The fault current is given by Equation 3:

$$I_{FAULT} = I_{PV1} + I_{PVn} \quad \text{(Eq. 3)}$$

The example 4 A inverter ground fuse 130 and the example 12 A string fuse 132 (FIG. 1A) will open. A time delayed 4 A ground fuse 130 is desirable to allow the 12 A string fuse 132 to clear the backfeed ($I_{PVn}$) and identify the faulted string first, then the 4 A ground fuse 130 will open to clear the contribution from the faulted string ($I_{PV1}$) and shut down the inverter 6.

For the disclosed concept, the likely result is $I_{FAULT}$ (Equation 3, above) will be determined by the total capacity of all PV strings 50 in the PV array including backfeed from all other combiner boxes (not shown). Fault clearing will depend on the coordination between the fuses 130,132, and between the 12 A string fuse 132 and the DC feeder protection system 2. A fast acting 12 A string fuse 132 will clear the backfeed quickly, reducing the fault level to $I_{PV1}$ and providing identification of the faulted string. A time delayed 4 A inverter ground fuse 130 is desirable and will allow the DC feeder protection system 2 to detect the string ground fault and isolate the combiner box 4 from ground, thereby totally mitigating the fault while allowing the overall PV system to continue operating at reduced capacity.

Example 24

For a positive to negative fault on one of the PV strings 50 (prior to input by the combiner box 4 of FIG. 1A), a conventional PV array system will likely result with $I_{FAULT}$ (Equation 3, above) initially determined by the total output of all PV strings 50 in the PV array, including backfeed from all other combiner boxes (not shown). The 12 A string fuse 132 will open to remove $I_{PV1}$, after the initial fault, but $I_{PV1}$ will persist.

For the disclosed concept, the likely result is $I_{FAULT}$ will be limited to the contribution of the faulted PV string by the blocking diode 48, $I_{PV1}$, which will persist. The detection of the loss of a PV string may be possible at the feeder level if the output of the faulted PV string was near maximum at the inception of the fault.

Example 25

For a negative to ground fault on a combiner box feeder (prior to input by the inverter 6), a conventional PV array system could result with a maximum current $I_{FAULT}$ determined by the total output of all PV array strings 50 connected to all combiner boxes (only one combiner box 4 is shown in FIG. 1A) as shown by Equation 4. Current will flow through both the negative conductor and through the ground conductor. The amount through each conductor is inversely proportional to the impedance (resistance) of each.

$$I_{FAULT}=I_{CB1}+I_{CBn} \quad (Eq.\ 4)$$

wherein:

$I_{CB1}$ is current of the combiner box connected to the faulted feeder; and $I_{CBn}$ is current of all other combiner boxes in the system. Here, the 4 A inverter ground fuse 130 will open to clear the fault, and the location of the fault will be difficult to determine.

For the disclosed concept, the likely result is $I_{FAULT}$ (Equation 4, above) is determined by the total output of all PV array strings 50 connected to all combiner boxes (not shown). The 4 A inverter ground fuse 130 will open and/or the DC feeder protection system 2 will operate to clear the fault depending on the speed of the applied fuse. A time delay fuse would be preferable to allow the DC feeder protection system 2 to operate to trip both two-pole circuit interrupters 24,30 and provide an alarm indication so that the fault can be located easily while the overall PV system continues to operate at reduced output.

Example 26

For a positive to ground fault on a combiner box feeder (prior to input by the inverter 6 of FIG. 1B), a conventional PV array system will likely result with $I_{FAULT}$ determined by the current division between the ground path resistance and the resistance of the intended positive conductors, typically $R_{GROUND}>R_{CONDUCTOR}$. The fault can be supplied by all PV strings 50 in the PV array, including backfeed from other combiner boxes (not shown). The fault current is shown by Equation 5:

$$I_{FAULT}=(R_{CONDUCTOR}/R_{GROUND})\times(I_{CB1}+I_{CBn}) \quad (Eq.\ 5)$$

The 4 A inverter ground fuse 130 will open to clear the fault, but will provide no information as to the location of the problem.

For the disclosed concept, the likely result is $I_{FAULT}$ (Equation 5, above) determined by the current division between the ground path resistance and the resistance of the intended positive conductors. The 4 A inverter ground fuse 130 is likely to open and/or the DC feeder protection system 2 will operate to clear the fault depending on the speed of the applied fuse. A time delay fuse is desirable to allow the DC feeder protection system 2 to clear the fault and provide an alarm so that the fault can be easily located while the remainder of the overall PV system can continue to operate at reduced capacity.

Example 27

For a positive to negative fault on a combiner box feeder (prior to input by the inverter 6 of FIG. 1B), a conventional PV array system will likely result with $I_{FAULT}$ (Equation 4, above) determined by the total output of all PV array strings 50 connected to all combiner boxes (not shown). The associated fuse at the recombiner would open (due to the backfeed currents from other feeders), but there is no protection for this event. Recombiner fuses are not shown in the figures; however, they are discussed in Example 31. The fault will persist as long as there is output from the PV strings 50. Significant damage is likely.

For the disclosed concept, the likely result is $I_{FAULT}$ (Equation 4, above). The DC feeder protection system 2 will detect the fault as both reverse direction at the inverter end and as differential for the feeder and will operate to trip the two two-pole circuit interrupters 24,30 at both ends of the feeder and provide an alarm. The overall PV system will continue to operate at reduced output.

Example 28

For a positive to ground fault on one of the PV strings 50 (prior to input by the combiner box 4 of FIG. 1A) and a subsequent negative to ground fault on a combiner box feeder (prior to input by the inverter 6 of FIG. 1B), a conventional PV array system will likely result with the initial $I_{FAULT}$ on the PV string 50 behaving similar to that of Example 22 (Equation 1), above. This fault current causes the 4 A inverter ground fuse 130 to open, thereby resulting in the shutdown of the inverter 6.

If there is full sun on the PV array and no load, the maximum voltage is present on the DC system, which can stress the insulation between the system negative and ground. A subsequent negative to ground fault on the combiner box feeder produces a positive to negative fault involving two fault locations at a higher fault current. There is no protection for this fault. Current will continue as long as the PV array provides output. Significant damage is likely.

For the disclosed concept, the likely initial result in response to the initial positive to ground fault is similar to that of Example 22 (Equation 2). Without opening the 4 A inverter ground fuse 130, the negative to ground insulation is not subjected to additional stress. When this is coupled with the alarm generated by the DC feeder protection system 2, it is possible that a subsequent negative to ground feeder fault could be avoided. However, if the subsequent fault were to occur, then the DC feeder protection system 2 would operate to isolate the faulted feeder and provide an indication alarm. Assuming a time delay 4 A inverter ground fuse 130 is applied, the DC feeder protection system 2 could clear the fault before the overall PV system is shut down, thereby allowing it to continue to operate at reduced output while the faults are being addressed.

Example 29

For a negative to ground fault on one of the PV strings 50 (prior to input by the combiner box 4 of FIG. 1A) and a subsequent positive to ground fault on a combiner box feeder (prior to input by the inverter 6 of FIG. 1B), a conventional PV array system will likely result with the initial $I_{FAULT}$ on the PV string 50 similar to that of Example 23 (Equation 3) with the initial fault current causing the 4 A inverter ground fuse 130 to open, thereby resulting in the shutdown of the inverter 6.

If there is full sun on the PV array and no load, maximum voltage is present on the DC system, which can stress the insulation between the system positive and ground. A subsequent positive to ground fault on the feeder produces a positive to negative fault involving two fault locations at a higher fault current $I_{FF}$, resulting in the opening of string fuse 132. In turn, this reduces the fault level to that of the output of a single string. Current will continue as long as the PV array provides output. Significant damage is likely.

For the disclosed concept, the likely initial result in response to the initial negative to ground fault is similar to that of Example 23 (Equation 3). After the 4 A inverter ground fuse 130 opens, the positive to ground insulation is subjected to additional stress, although with a suitably quick response to the inverter shutdown it is possible that the positive to ground feeder fault can be avoided. However, if the second fault were to occur, the DC feeder protection system 2 would operate to isolate the faulted feeder and provide an indication alarm.

Example 30

For a positive to ground fault on one combiner box feeder (prior to input by the inverter 6 of FIG. 1B) and a subsequent negative to ground fault on another combiner box feeder (prior to input by the inverter 6 of FIG. 1B), a conventional PV array system will likely result with the initial $I_{FAULT}$ on the PV string 50 similar to that of Example 26 (Equation 5). This fault current causes the 4 A inverter ground fuse 130 to open, resulting in the shutdown of the inverter 6.

If there is full sun on the PV array and no load, the maximum voltage is present on the DC system, which can stress the insulation between the system negative and ground. The subsequent negative to ground fault on the second feeder produces a positive to negative fault involving two fault locations at a higher fault current. There is no protection for this fault. Current will continue as long as the PV array provides output. Significant damage is likely.

For the disclosed concept, the likely initial result in response to the initial fault on the first combiner box feeder is similar to that of Example 26. With a time delay 4 A inverter ground fuse 130, the first combiner box feeder will be isolated by the DC feeder protection system 2 and an indication alarm will be provided. Hence, the overall PV system will continue to operate at reduced output.

The system response to the second fault on the second combiner box feeder will be similar to Example 25. Again, with a time delay 4 A inverter ground fuse 130, the fault will be cleared by the second combiner box feeder protection system, and the overall PV system will continue to operate at a further reduction in output.

Example 31

The string fuses 132 are part of known combiner boxes, such as 4, and blocking diodes 48 are included in some. The above nine Examples 22-30, describe the application of blocking diodes 48 as part of a total design solution and are not part of the DC feeder protection system 2. The known existing technology, without more, does not provide complete protection for the feeders between the combiner boxes, such as 4, and the inverter 6.

Not considered in the above analysis is the application of fuses in each feeder at the inverter DC bus 110. There are three basic concerns in evaluating the effectiveness of fuse protection of PV system feeders. First, the number of feeders is considered. Because fuses must be sized to carry 125% of the maximum fault current of the combiner box sub-array, they cannot operate based on the contribution of the feeder on which they are applied. Assuming that the PV array is configured with multiple combiner box sources of equal size, because of the position of the fuse in the circuit, at least three combiner box feeders are employed to provide enough back feed to cause any fuse to operate under maximum fault conditions.

A second concern is feeder balance. For the "three feeder" rule to apply, the feeders must be of equal size. However, some installations use feeders of unequal sizes and this further impacts the effectiveness of fuse protection and complicates the analysis. For example, a PV system is configured with two equal sized feeders each contributing one quarter of the total capacity and a third that contributes the remaining half For simplicity, the example total PV array fault current is 400 A (two 100 A contribution feeders and one 200 A). In this example, the smaller feeders would be fused at 125 A and the larger feeder at 250 A. While the fuses on the smaller feeders can operate due to back feed which can potentially be 300 A, the fuses on the larger feeder could never operate because the combination of the smaller feeders back feeding is only 200 A.

The third consideration is irradiance. Since the output of a PV string, such as 50, or PV array is directly proportional to the irradiance, and the irradiance is not a constant, it is very difficult to predict the performance of fuse protection in general. At times of maximum irradiance, fuses may provide some level of protection subject to the other conditions discussed, above, but at low irradiance it is likely that fuses will only operate when the fuse rating is very small relative the total output of the PV array at the time of fault. In the example above, if the irradiance limits the system output to 50%, even the smaller feeder fuses will be subjected to a current of only 150 A (120% of the rating) and will likely take a very long time to operate, and at 41% output will never operate.

Taking the above into consideration, the use of fuses as the mechanism of protection for combiner box feeders has limited effectiveness. By contrast, the protection thresholds that can be applied when using differential and residual summation are independent of feeder rating, and therefore can be set to detect very low levels of abnormal current flow during fault conditions.

Example 32

The disclosed concept can be provided in a variety of embodiments ranging from an assembly of commercially available devices to form a complete protective system, to a specially designed and purpose built integrated module.

A first example embodiment is a prototype assembly of commercially available devices to provide analog summation. In this example, the system includes commercially available devices including the PLC 112 (FIG. 2B) with conventional ADCs 104,106,108, display 62, isolation amplifiers 102 and current shunts 100. The primary advantage of this example embodiment is that it allows a rapid progression from concept to a workable device at very low development cost. The primary drawback of this embodiment is the inability of the ADCs 104,106,108 to provide data from multiple signal inputs to the PLC 112 for protective analysis (e.g., ADC channels are processed sequentially, not simultaneously); therefore, the differential and residual summations are performed in the analog circuits. However, with the use of analog summation, a PLC can perform discrimination and timing logic needed to detect fault conditions, generate trip and status outputs and accept operator inputs, along with performing calculations to display metered quantities, display system statuses, trip, and store data and provide indications in conjunction with protective trip functions.

Example 33

Another example embodiment is a purpose built device employing analog summation. This replaces the PLC 112 and ADCs 104,106,108 with a suitable device that integrates the conversion of analog signals to digital data, the logical processing of that data to provide the protective functions, and operator interface. The primary advantage of this embodiment is better packaging (e.g., smaller and easier to install), and improved performance due to a more focused logic design compared to that which is possible using a PLC.

Example 34

Another example embodiment is a purpose built device employing digital summation. This replaces sequential analog to digital conversion with simultaneous analog to digital conversion or digital signal processing. The benefit of this is the ability to perform digital summation of the measured currents in place of analog summation. The advantage of digital summation is that it eliminates the need to balance the analog performance of multiple signals and allows all tuning to be done with digital scaling. With the introduction of digital scaling, comes the ability to allow the system to "self calibrate" at installation, which eliminates set-up errors and provides superior tolerance of erroneous signals (noise) in the application environment, both of which will yield better performance of the installed system.

Example 35

Alternatives include digital summation, which eliminates the need for analog summation circuitry. The first is a sophisticated PLC that could provide simultaneous conversion of four analog signals to digital values. The second is a special purpose ADC and processor to replace the PLC 112, ADC modules 104,106,108, and potentially the isolation amplifiers 102.

Example 36

The example PLC 112 provides a relatively low cost and is readily available for proof of concept.

Example 37

At present, grounded DC systems are covered by known existing code. It is conceivable that in the future the code will allow for the installation of ungrounded systems using some form of ground detection (e.g., high impedance) and a corresponding alarm function. In these ungrounded systems, a first ground fault would trigger an alarm, but would not provide for any tripping as it would not result in any current flow or subsequent damage. Also, the intention of ungrounded systems is to provide a relatively higher continuity of service. The expectation is that the operator would take action based on the alarm to identify and repair the fault before any additional fault would occur. However, should this practice not be followed rigorously, any second ground fault would result in current flow in an unintended path with potential for damage. The disclosed concept provides protection for this condition and acts as it would with a single ground fault on intentionally grounded systems currently covered by the code.

The disclosed concept provides a DC feeder protection system 2, which protects the feeder between the combiner box 4 and the inverter 6.

The disclosed concept can prevent fires and minimize the level of back-feeding on the unprotected leg of DC power coming from a DC power source, such as a PV string, into a combiner box. For example, it is believed that this provides a new level of safety and protection for solar roof-top systems, as well as other similar applications of multiple DC sources being combined for conversion to AC power.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A direct current feeder protection system comprising:
a first conductor;
a second conductor;
a third conductor;
a fourth conductor;
a fifth conductor;
a sixth conductor;
a first current sensor structured to sense first current flowing in the first conductor;
a second current sensor structured to sense second current flowing in the second conductor;
a third current sensor structured to sense third current flowing in the third conductor;
a fourth current sensor structured to sense fourth current flowing in the fourth conductor;
four circuit interrupters structured to interrupt currents flowing in the first, second, third and fourth conductors; and
a processor cooperating with said first, second, third and fourth current sensors to input said sensed first, second, third and fourth currents, respectively, and to output a number of commands to said four circuit interrupters, said processor comprising a routine structured to detect a number of: a directional current fault of said sensed first, second, third or fourth currents, a differential current fault of said sensed first and third currents or said sensed second and fourth currents, and a residual current fault of said sensed first and second currents or said sensed third and fourth currents, and to responsively output said number of commands,
wherein the first, fifth and third conductors are electrically connected in series with two of said four circuit interrupters, and
wherein the second, sixth and fourth conductors are electrically connected in series with the other two of said four circuit interrupters.

2. The direct current feeder protection system of claim 1 wherein said first, second, third and fourth current sensors are bipolar direct current transducers.

3. The direct current feeder protection system of claim 1 wherein each of said first, second, third and fourth current sensors comprises a current shunt and an isolation amplifier, said isolation amplifier including an input electrically connected to said shunt and an output having a voltage proportional to a corresponding one of said sensed first, second, third and fourth currents; wherein said processor further comprises a first analog to digital converter comprising a first channel inputting said voltage output by said isolation amplifier of said first current sensor, a second channel inputting said voltage output by said isolation amplifier of said fourth current sensor, a common inputting said voltage output by said isolation amplifier of said third current sensor, a first output having a signal proportional to differential current of said first and third conductors, and a second output having a signal proportional to residual current of said third and fourth conductors; wherein said processor further comprises a second analog to digital converter comprising a first channel inputting said voltage output by said isolation amplifier of said fourth current sensor, a second channel inputting said voltage output by said isolation amplifier of said first current sensor, a common inputting said voltage output by said isolation amplifier of said second current sensor, a first output having a signal proportional to differential current of said second and fourth conductors, and a second output having a signal proportional to residual current of said first and second conductors; and wherein the routine of said processor is further structured to detect said differential current fault from the first output of said first or second analog to digital converters, and to detect said residual current fault from the second output of said first or second analog to digital converters.

4. The direct current feeder protection system of claim 1 wherein said processor comprises an analog to digital converter comprising four outputs and four inputs inputting said sensed first, second, third and fourth currents; wherein, for each of said four outputs, the routine of said processor is further structured to detect said reverse current fault from a corresponding one of the four outputs; and wherein said reverse current fault is detected when the corresponding one of the four outputs exceeds a predetermined value for a predetermined time.

5. The direct current feeder protection system of claim 1 wherein said four circuit interrupters are structured to be opened manually or opened in response to an external signal.

6. The direct current feeder protection system of claim 1 wherein the routine of said processor is further structured to detect each of said directional current fault, said differential current fault and said residual current fault.

7. The direct current feeder protection system of claim 6 wherein the routine of said processor comprises a pick-up threshold and a trip delay for said each of said directional current fault, said differential current fault and said residual current fault.

8. The direct current feeder protection system of claim 1 wherein the routine of said processor is further structured to detect said residual current fault and to responsively output said number of commands.

9. The direct current feeder protection system of claim 1 wherein the routine of said processor is further structured to detect said differential current fault and to responsively output said number of commands.

10. The direct current feeder protection system of claim 1 wherein the routine of said processor is further structured to detect said directional current fault and to responsively output said number of commands.

11. The direct current feeder protection system of claim 1 wherein said processor is a programmable logic controller.

12. The direct current feeder protection system of claim 1 wherein said processor comprises a number of first outputs to provide said number of commands; and wherein said processor further comprises a number of second outputs structured to indicate a trip status of said four circuit interrupters.

13. The direct current feeder protection system of claim 1 wherein said processor comprises an output structured to indicate that said direct current feeder protection system is functional.

14. The direct current feeder protection system of claim 1 wherein said processor comprises a display structured to display at least one of: said directional current fault, said differential current fault, said residual current fault, a status of said four circuit interrupters, said sensed first, second, third and fourth currents at a time of a trip, two differential current values, and two residual current values.

15. The direct current feeder protection system of claim 1 wherein said processor comprises a communication interface structured to communicate to a remote location at least one of: said directional current fault, said differential current fault, said residual current fault, a status of said four circuit interrupters, said sensed first, second, third and fourth currents at a time of a trip, two differential current values, and two residual current values.

16. The direct current feeder protection system of claim 1 wherein said four circuit interrupters comprise shunt trip devices responsive to said number of commands.

17. The direct current feeder protection system of claim 1 wherein said first and second current sensors comprise a first summer to provide a first residual current signal to said processor; wherein said third and fourth current sensors comprise a second summer to provide a second residual current signal to said processor; wherein said first and third current sensors comprise a third summer to provide a first differential current signal to said processor; wherein said second and fourth current sensors comprise a fourth summer to provide a second differential current signal to said processor; wherein the routine of said processor is further structured to determine the residual current fault from said first or second residual current signals; and wherein the routine of said processor is further structured to determine the differential current fault from said first or second differential current signals.

18. The direct current feeder protection system of claim 1 wherein said processor comprises an analog to digital converter comprising four inputs inputting said sensed first, second, third and fourth currents, and an output of first, second, third and fourth current values, respectively; wherein the routine of said processor is further structured to subtract the first and second current values to provide a first residual current signal, to subtract the third and fourth current values to provide a second residual current signal, to subtract the first and third current values to provide a first differential current signal, to subtract the second and fourth current values to provide a second differential current signal, to determine the residual current fault from said first or second residual current signals, and to determine the differential current fault from said first or second differential current signals.

19. A direct current feeder protection system for use with a combiner box and an inverter, said direct current feeder protection system comprising:
a first conductor;

a second conductor;
a third conductor;
a fourth conductor;
a fifth conductor;
a sixth conductor;
a first current sensor structured to sense first current flowing in the first conductor from the combiner box;
a second current sensor structured to sense second current flowing in the second conductor to the combiner box;
a first two-pole circuit interrupter structured to interrupt currents flowing in the first and second conductors;
a third current sensor structured to sense third current flowing in the third conductor to the inverter;
a fourth current sensor structured to sense fourth current flowing in the fourth conductor from the inverter;
a second two-pole circuit interrupter structured to interrupt currents flowing in the third and fourth conductors; and
a processor cooperating with said first, second, third and fourth current sensors to input said sensed first, second, third and fourth currents, respectively, and to output a number of commands to said first and second two-pole circuit interrupters, said processor comprising a routine structured to detect a number of: a directional current fault of said sensed first, second, third or fourth currents, a differential current fault of said sensed first and third currents or said sensed second and fourth currents, and a residual current fault of said sensed first and second currents or said sensed third and fourth currents, and to responsively output said number of commands,
wherein the first, fifth and third conductors are electrically connected in series with a first pole of each of said first and second two-pole circuit interrupters, and
wherein the second, sixth and fourth conductors are electrically connected in series with a second pole of each of said first and second two-pole circuit interrupters.

20. The direct current feeder protection system of claim 19 wherein said combiner box comprises a plurality of blocking diodes; and wherein each of said plurality of blocking diodes corresponds to input from a corresponding direct current power source.

21. The direct current feeder protection system of claim 19 wherein said combiner box comprises a plurality of fuses; and wherein each of said fuses corresponds to input from a corresponding direct current power source.

* * * * *